(12) United States Patent
Legner et al.

(10) Patent No.: US 7,814,813 B2
(45) Date of Patent: Oct. 19, 2010

(54) HYDROSTATIC-MECHANICAL TRANSMISSION

(75) Inventors: Jurgen Legner, Friedrichshafen (DE); Klaus Baumann, Wangen (DE); Martin Haffner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 532 days.

(21) Appl. No.: 11/854,642

(22) Filed: Sep. 13, 2007

(65) Prior Publication Data

US 2008/0070735 A1 Mar. 20, 2008

(30) Foreign Application Priority Data

Sep. 14, 2006 (DE) .................. 10 2006 043 289

(51) Int. Cl.
*F16H 47/00* (2006.01)
(52) U.S. Cl. .................................... 74/730.1
(58) Field of Classification Search ............... 74/730.1; 60/487
See application file for complete search history.

(56) References Cited

U.S. PATENT DOCUMENTS

| | | |
|---|---|---|
| 2,683,422 A | 7/1954 | Richards, Jr. |
| 3,199,460 A | 8/1965 | Bush et al. |
| 3,851,952 A | 12/1974 | Werz et al. |
| 4,843,818 A * | 7/1989 | Thoma et al. ............... 60/488 |
| 5,042,252 A * | 8/1991 | Havens et al. .............. 60/487 |
| 5,177,967 A * | 1/1993 | von Kaler et al. ........... 60/487 |
| 5,239,827 A * | 8/1993 | Havens ..................... 60/487 |
| 5,392,603 A * | 2/1995 | Havens et al. .............. 60/327 |
| 5,400,594 A * | 3/1995 | Hayens ..................... 60/487 |
| 5,992,150 A * | 11/1999 | Eberle ..................... 60/487 |
| 6,161,508 A | 12/2000 | Lindblad |

FOREIGN PATENT DOCUMENTS

| | | |
|---|---|---|
| DE | 1261761 | 2/1968 |
| DE | 3441966 | 5/1986 |
| DE | 19612309 A1 | 10/1997 |
| DE | 102004023631 A1 | 12/2005 |
| DE | 102004038506 A1 | 2/2006 |
| DE | 102004048174 A1 | 4/2006 |
| GB | 2167138 A | 5/1986 |

* cited by examiner

*Primary Examiner*—Ha D. Ho
(74) *Attorney, Agent, or Firm*—Davis & Bujold, P.L.L.C.

(57) ABSTRACT

A hydrostatic-mechanical transmission having a radial piston motor (1) with a crankshaft (2) which drives a spur gear (7). A transmission housing comprises three housing portions which define two separate spaces. The spur gear arrangement is located in one of the spaces while the radial piston motor is located in the other space.

10 Claims, 7 Drawing Sheets

US 7,814,813 B2

HYDROSTATIC-MECHANICAL TRANSMISSION

This application claims priority from German patent application serial no. 10 2006 043 289.4 filed Sep. 14, 2006.

FIELD OF THE INVENTION

The invention relates to a hydrostatic-mechanical transmission.

BACKGROUND OF THE INVENTION

DE 10 2004 023 631 A1 discloses a hydrostatic-mechanical transmission having a radial piston motor with a crankshaft, the crankshaft driving a spur gear which is actively connected with another spur gear and powers the drive output.

Transmissions of this type are used for example in working machines such as wheel loaders.

The purpose of the present invention is to provide a hydrostatic-mechanical transmission which is of compact structure and built to ensure reliable operation.

SUMMARY OF THE INVENTION

According to the invention, the hydrostatic-mechanical transmission comprises at least one radial piston engine having a crankshaft that drives a spur gear. The transmission housing consists of three transmission housing portions which form at least two spaces, such that the spur gear transmission is located in a first space formed by a first and second housing portion, and the radial piston motor is located in a second space formed by the second and a third transmission housing portion. In particular, the cylinders of the radial piston motor are mounted in the second and third housing portions. This makes it possible to connect a valve housing to the third housing portion to accommodate the valves and the pressure medium inlets for the radial piston motor. Since the second housing portion separates the first space from the second space, the first space can be sealed tight against pressure fluid relative to the second space, so that for example the spur gear transmission can be supplied with a lubricant different from that supplied to the radial piston motor.

Furthermore, leakage from the radial piston motor can be drained into the second space, which can for example be connected by lines to a cooler, and the leaked oil can then be passed into a pressure medium reservoir via the cooler.

In a further embodiment a flushing valve is arranged in the valve housing, through which hot pressure medium passes from the radial piston motor into the second space, through which, after mixing with the leakage, the pressure medium and the leaked oil are transferred via the cooler. This arrangement enables a very compact hydrostatic-mechanical transmission to be made, which can be operated with different lubricants and in which the radial piston motor is protected against overheating by simple means.

Preferably, the crankshaft is supported at three bearing points, whereby the dimensions of the crankshaft can be such that at the maximum permissible deflection under load, the structural space available need not change. Preferably, one bearing point is located between the spur gear and the eccentric portion of the crankshaft and the other two bearing points are respectively in the area of the crankshaft's ends.

In a further embodiment of the invention the spur gear has with spiral toothing and the two bearings, close to the eccentric portion of the crankshaft, are conical roller bearings, whereby the conical roller bearing located in the area of the pressure medium inlet to the cylinders produces an axial force component that opposes the hydraulic force in the area of the pressure medium distributor, so that distortion of the housing portion in which the pressure medium inlets are located is reduced. Since the spur gear has bearing points on both sides, the radial force produced by the co-operation of the spur gears is transferred directly to the transmission housing, and this too reduces the distortion of the crankshaft under load. Since the pressure medium distributor is connected with the crankshaft via a connecting shaft, this reduction of the crankshaft's distortion also reduces the radial movement of the pressure medium distributor.

In another embodiment of the invention the transmission housing consists of three transmission housing portions:

a first housing portion in which the spur gears and the first bearing point in the area of the spur gear are located, a second housing portion, which forms the middle bearing point between the spur gear and the eccentric part of the crankshaft, and a third housing portion, which holds the third bearing point and contains the pressure medium inlets.

Connected to the third housing portion is a valve housing that contains the pressure medium distributor and the pressure medium connections and other valves, this structure makes it possible for the first and second housing portions to provide a lubricant space within which the spur gears are arranged, the second and third housing portions to provide a lubricant space in which the main components of the radial piston motor are arranged, and the valve housing to hold the valve components.

Preferably, the lubricant space containing the spur gears and the lubricant space containing the radial piston motor are sealed to be fluid-tight relative to one another.

In a further embodiment the spur gear actively connected with the crankshaft drives another spur gear, which powers the drive output, which has either two output flanges, one at each end of the drive output shaft, or one output flange and a bevel pinion, in order to incorporate the hydrostatic-mechanical transmission either between the front and rear axles of the vehicle, so as to drive the front and rear axles, or to incorporate it directly on the rear axle, so that the other axle is driven by the remaining drive flange via a Cardan shaft.

BRIEF DESCRIPTION OF THE DRAWINGS

Other features emerge from the description of the figures, in which.

DETAILED DESCRIPTION OF THE PREFERRED EMBODIMENTS

Figure 1:
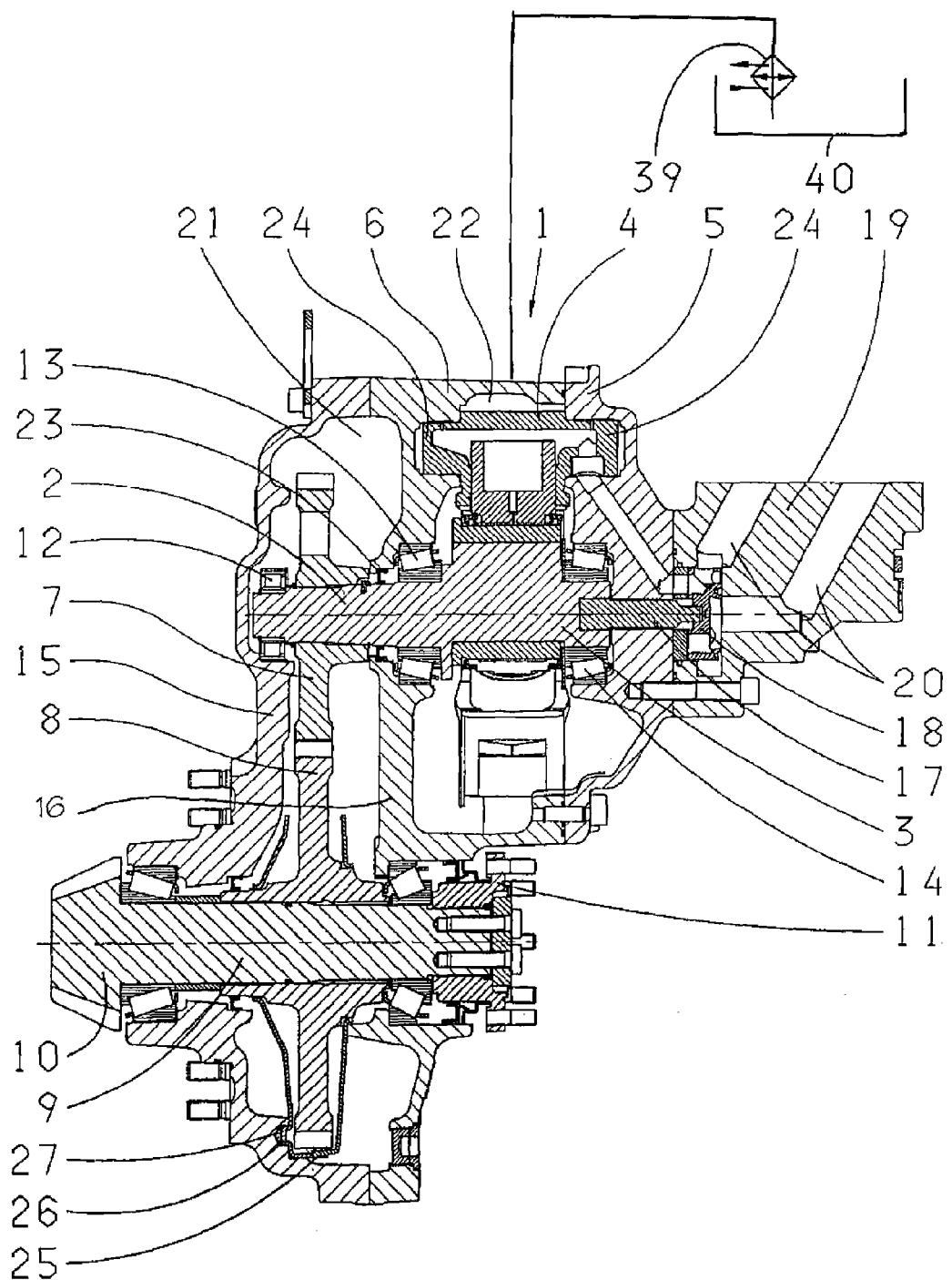
FIG. 1 in a sectional view through the hydrostatic-mechanical transmission with a radial piston motor.

FIG. 1 shows a hydraulic radial piston motor 1 with a crankshaft 2 having an eccentric section 3 with a cylinder 4, which is mounted on one side in the third housing portion 5 and the second housing portion 6. The crankshaft 2 is connected in a rotationally fixed manner to a first spur gear 7. The first spur gear 7 is actively connected with a second spur gear 8, which drives a drive output shaft 9. If the driveshaft 9 has a pinion 10 and an output flange 11, the hydrostatic-mechanical transmission can be incorporated directly on a drive axle, but the drive output shaft 9 can also be fitted, on each side, with an output flange 11, so that the hydrostatic-mechanical transmission can be arranged between the drive axles.

Preferably, the first spur gear 7 and the second spur gear 8 are made with spiral toothing. The crankshaft 2 is mounted on a first bearing 12, a second bearing 13 and a third bearing 14. The first bearing 12 is located in the first housing portion 15 and forms the first bearing point. The second bearing 13 is located between the spur gear 7 and the eccentric section 3 in the second housing portion 6 and forms the second bearing point. For this, the second housing portion 6 has a housing wall 16. The third bearing 14 is located in the third housing portion 5 and forms the third bearing point. Via a connecting shaft 17, which can also be made integrally with the crankshaft 2, the latter drives a pressure medium distributor 18. Thanks to the special mounting of the crankshaft 2 its distortion under load is reduced, and this also improves the function of the pressure medium distributor 18. The pressure medium distributor 18 is located in a valve housing 19, which also contains the valves and main connections needed for the pressure medium supply 20. Together with the second housing portion 6, the first housing portion 15 forms a lubricant (first) space 21 which is sealed relative to the (second) space 22 by a seal 23 thus preventing leakage of pressure fluid between them. This enables different lubricants to be used in the (first and second) spaces 21 and 22. The valves in the valve housing and any leakage from the radial piston motor 1 flow into the space 22 and pass from there, via a line (not shown) and a cooler 39, into an external lubricant reservoir 40. The cylinder 4 has bearing trunnions 24 by means of which the cylinder 4 is mounted and able to rotate, and which are in active connection with a rotation angle sensor, by means of which the ballast volume of the hydraulic motor can be determined. This signal serves as a control magnitude to enable appropriate regulation of the ballast volume of the hydraulic motor. The second spur gear 8 is shielded by a shield 25 in order to reduce splashing losses when the second spur gear 8 is rotating. The shield 25 is preferably made in two parts, and both can be made from a plastic, for example a polyamide. The shield 25 has at least one projection, 26 which engages in a recess 27 to fix the position of the shield 25. The two individual parts of the shield 25 are plugged together in the axial direction and are in contact with the first housing portion 15 and the second housing portion 6 in the axial direction, so that the shield 25 remains closed. The bearing trunnions 24 have surfaces (not shown) extending in the axial direction, which prevent hydraulic pressure from building up between the blind-hole bore in the second housing portion 6 or in the third housing portion 5 and the bearing trunnion 24, which would push the second housing portion 6 and the third housing portion 5 apart.

Figure 2:
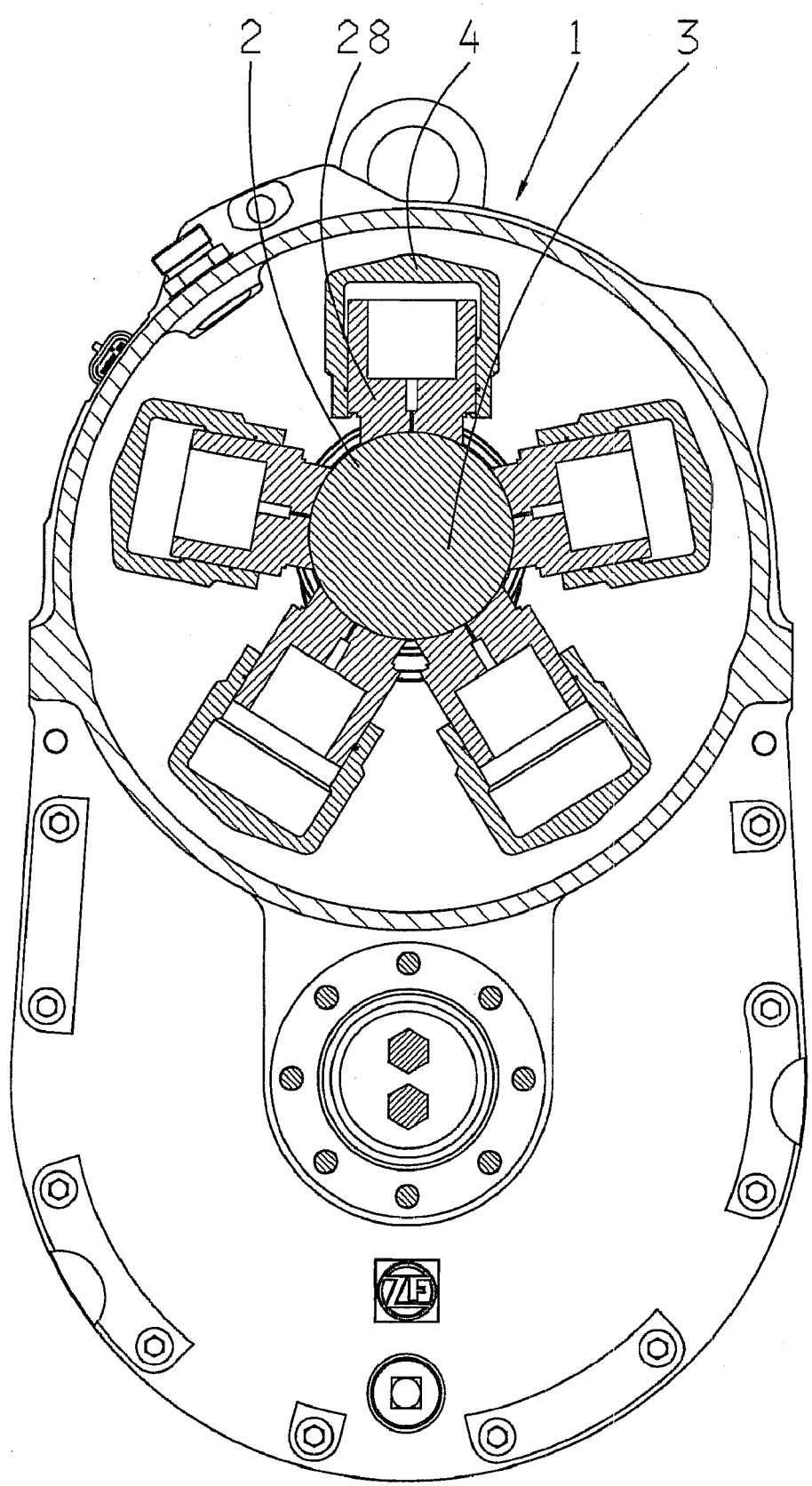
FIG. 2 in a sectional view through the radial piston motor of the hydrostatic-mechanical transmission in FIG. 1.

FIG. 2 shows the radial piston motor 1 has a crankshaft 2 whose eccentric section 3 moves pistons 28 in the cylinders 4.

Figure 3:
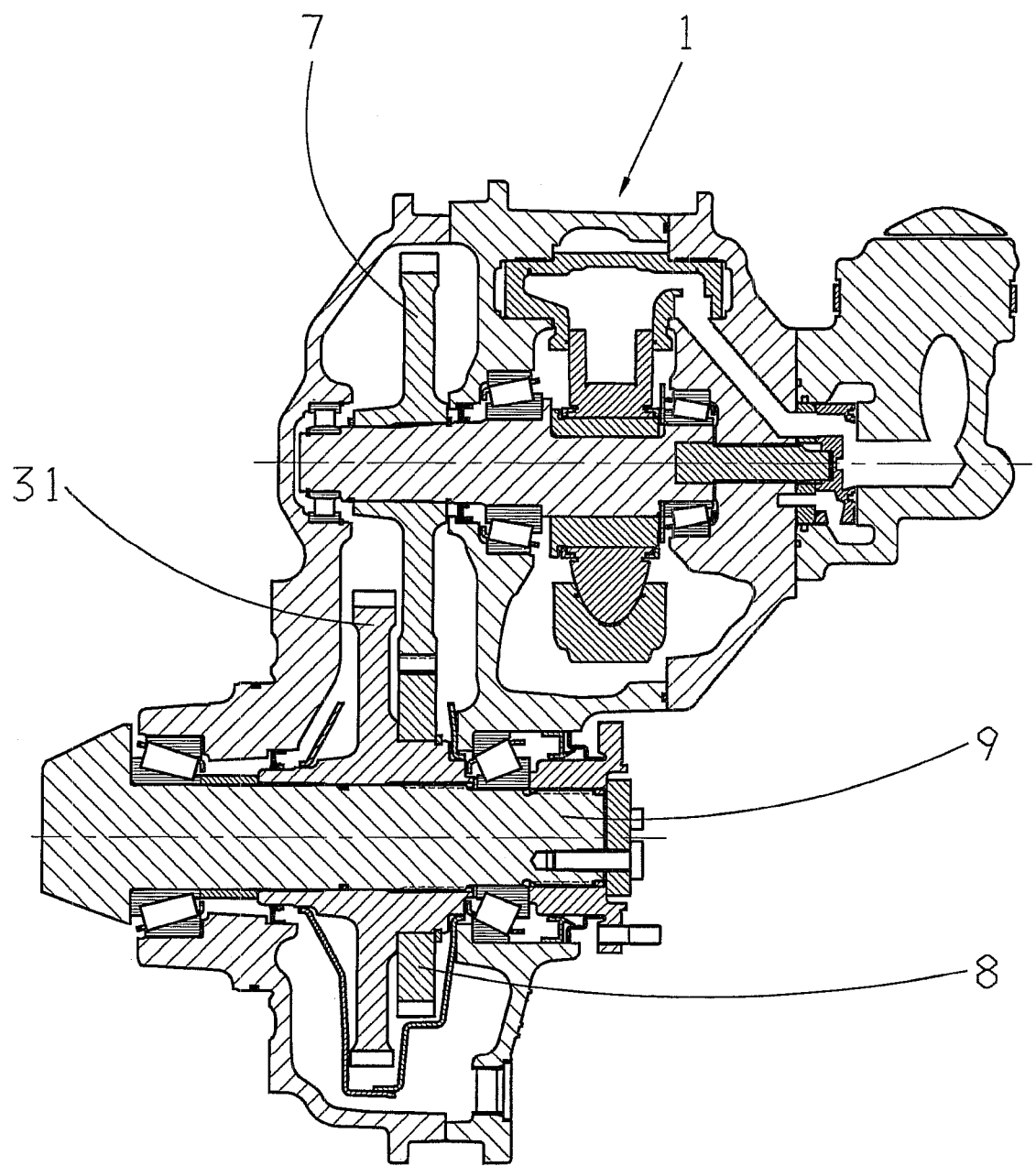
FIG. 3 in a sectional view through a hydrostatic-mechanical transmission with two radial piston motors.

FIG. 3 shows the hydrostatic-mechanical transmission in FIG. 3 differs from the hydrostatic-mechanical transmission in FIG. 1, in that there are two radial piston motors, each radial piston motor driving a spur gear actively connected with the spur gears arranged on a drive output shaft 9. The first radial piston motor 1 drives the first spur gear 7, which actively connected with the second spur gear 8 and which drives the drive output shaft 9. The second radial piston motor 29 (see FIG. 4) drives a third spur gear 30 (see FIG. 5), which is actively connected with a fourth spur gear 31 that drives the drive output shaft 9.

Figure 4:
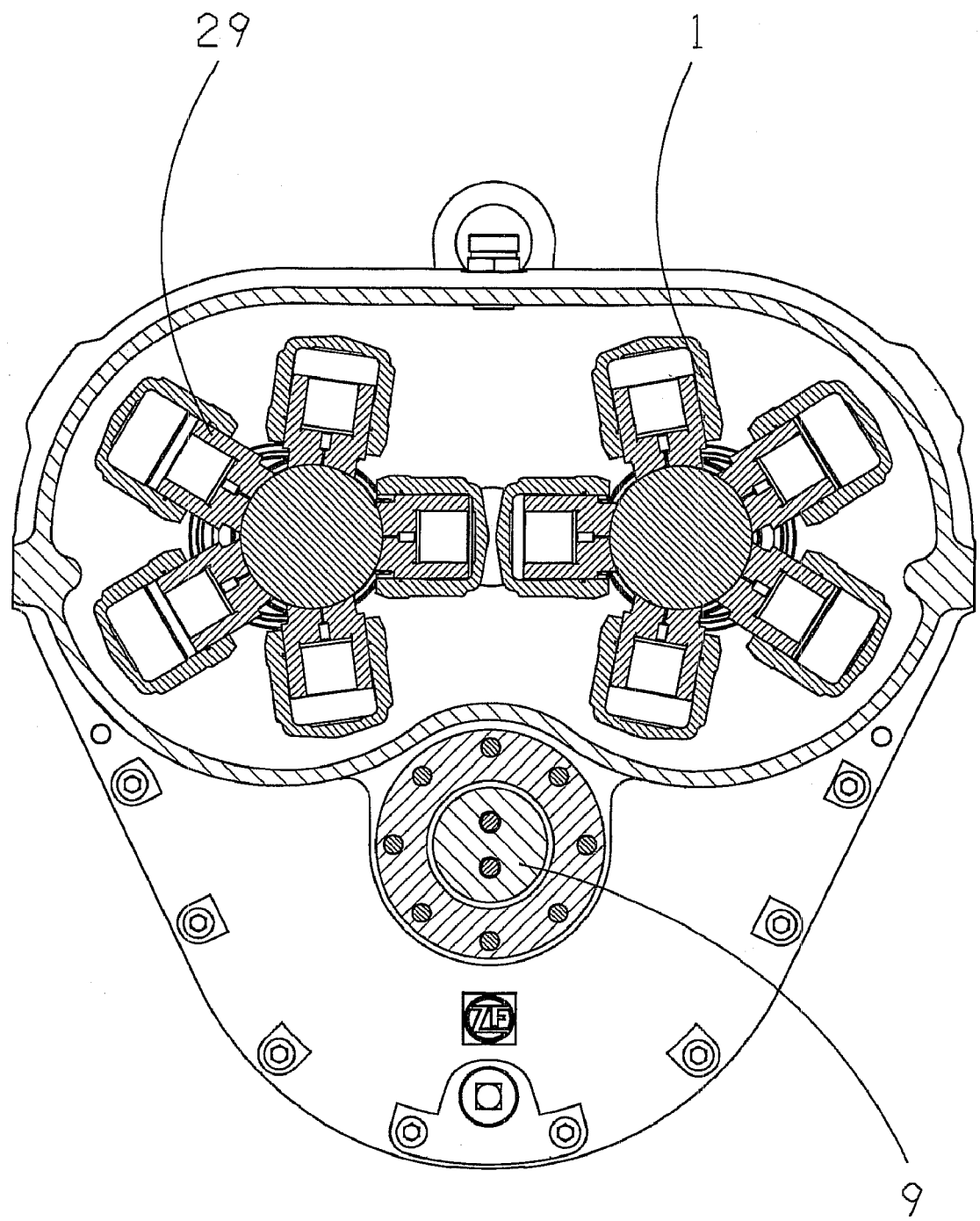
FIG. 4 in a sectional view through the radial piston motors of the hydrostatic-mechanical transmission in FIG. 3.

FIG. 4 shows the first radial piston motor 1 and the second radial piston motor 29 are actively connected with the drive output shaft 9.

Figure 5:
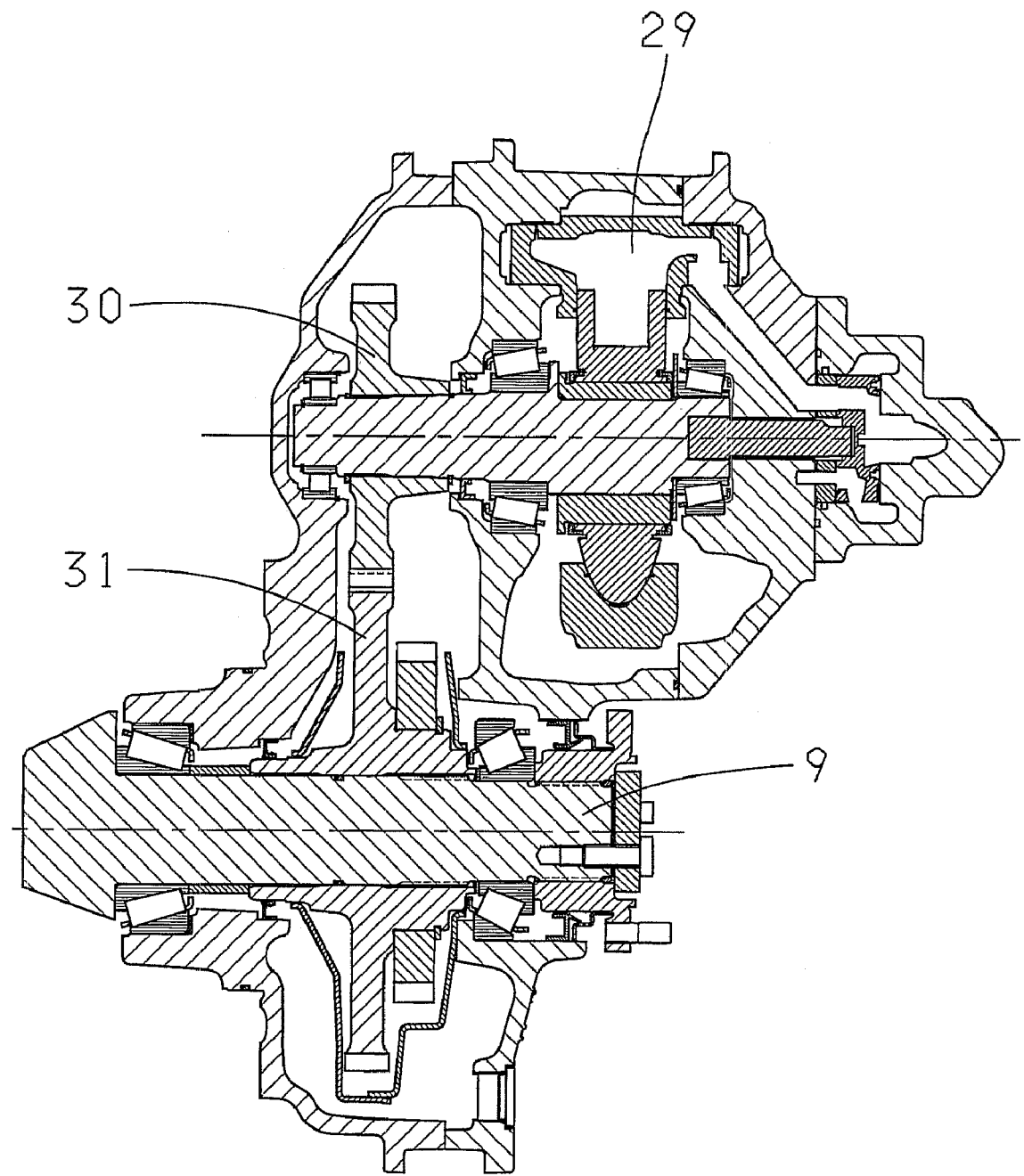
FIG. 5 in a sectional view through the other radial piston motor of the hydrostatic-mechanical transmission in FIG. 3.

FIG. 5 shows the second radial piston motor 29 drives the fourth spur gear 31 via the third spur gear 30, and thereby the drive output shaft 9.

Figure 6:
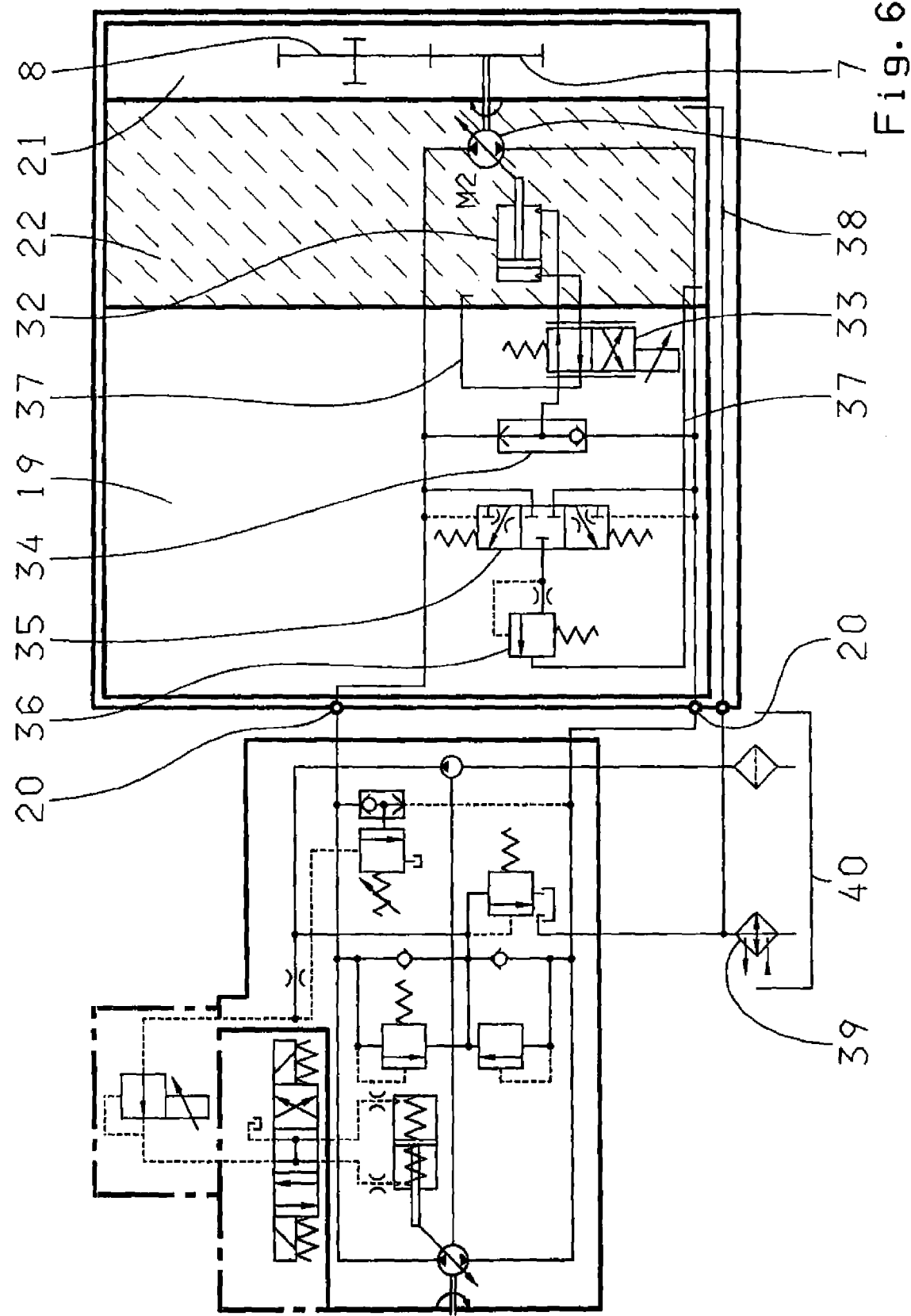
FIG. 6 is a hydraulic layout of the hydrostatic-mechanical transmission in FIG. 1.

FIG. 6 shows the first spur gear 7 and the second spur gear 8 are located within the space 21. In the space 22 are arranged the radial piston motor 1 and its stroke volume adjustment device 32. The valve housing 19 accommodates the 4/2 proportional valve 33 for adjusting the stroke volume, the two-way valve 34 and the flushing valve 35 with its associated pressure limiting valve 36. The valve housing 19 also contains the connections 20 for the main pressure medium supply. The valves in the valve housing 19 are vented through the line 37 leading to the space 22 and from there, through the line 38 and the cooler 39 into a pressure medium reservoir 40. Thus, the radial piston motor 1 is cooled sufficiently and the hydrostatic-mechanical drive has only a small number of connections.

Figure 7:
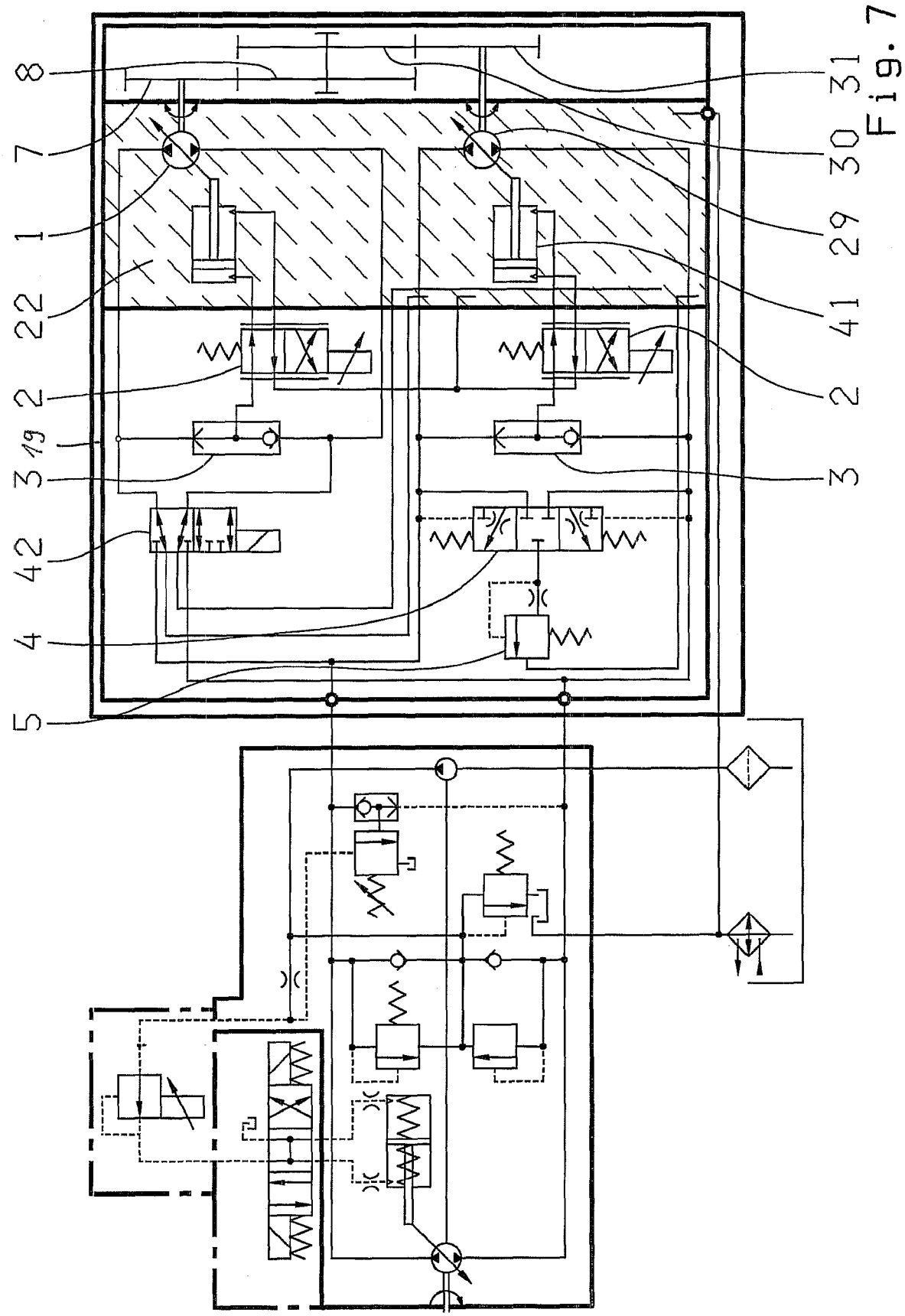
FIG. 7 is a hydraulic layout of the hydrostatic-mechanical transmission in FIG. 3.

FIG. 7 shows the first radial piston motor 1 with its stroke volume adjustment device 32 and the second radial piston motor 29 with its stroke volume adjustment device 41 are in the space 22, and the spur gears 7, 8, 30 and 31 are in the space 21. The valve housing 19 also has a cut-off valve 42 by means of which the first radial piston motor 1 can be fully connected to the space 22, whereby the radial piston motor 1, when its stroke volume is adjusted to zero, can be operated at very high speed since it is completely separate from the high-pressure inlet and heat losses can be dissipated through the connection with the space 22. Accordingly, it is no longer necessary to arrange a cut-off clutch between the first radial piston motor 1 and the first spur gear 7.

INDEXES

1 Radial piston motor
2 Crankshaft
3 Eccentric section
4 Cylinder
5 Third housing portion
6 Second housing portion
7 First spur gear
8 Second spur gear
9 Drive output shaft
10 Pinion
11 Drive output flange
12 First bearing
13 Second bearing
14 Third bearing
15 First housing portion
16 Housing wall
17 Connection shaft
18 Pressure medium distributor
19 Valve housing
20 Connections
21 Space
22 Space
23 Seal
24 Trunnions
25 Shield
26 Projection
27 Recess 28 Piston
29 Second radial piston motors
30 Third spur gear
31 Fourth spur gear
32 Stroke volume adjustment device
33 4/2 proportional valve
34 Two-way valve
35 Flushing valve
36 Pressure-limiting valve
37 Line
38 Line
39 Cooler
40 Pressure medium reservoir
41 Stroke volume adjustment device
42 Cut-off valve

The invention claimed is:

1. A hydrostatic-mechanical transmission comprising:
a radial piston motor (1) having cylinders (4) and a crankshaft (2) which powers a drive output via at least one spur gear arrangement (7, 8), the at least one spur gear arrangement (7, 8) and the radial piston motor (1) being arranged in a transmission housing,
wherein the transmission housing comprises at least first, second and third housing portions (5, 6, 15), the first housing portion (15) and the second housing portion (6) define a first space (21) in which the at least one spur gear arrangement (7, 8) is located, and the cylinders (4) are mounted on a side of both the second housing portion (6) and the third housing portion (5), and the second housing portion (6) and the third housing portion (5) define a second space (22) in which the radial piston motor (1) is located such that the second housing portion (6) is adjacent both the spur gear arrangement (7, 8) and the radial piston motor (1), and
the third housing portion (5) is connected to a valve housing (19), and
the valve housing (19) houses a flushing valve (35) through which the pressure medium flows from the radial piston motor (1), through a pressure medium return, into the second space (22).

2. The hydrostatic-mechanical transmission according to claim 1, wherein the radial piston motor (1) is supplied with a pressure medium via the valve housing (19).

3. The hydrostatic-mechanical transmission according to claim 1, wherein a leakage medium, from the radial piston motor (1), flows into the second space (22), defined by the second housing portion (6) and the third housing portion (5), and the leakage medium flows from the first space (22) through a cooler (39) and into a pressure medium reservoir (40).

4. The hydrostatic-mechanical transmission according to claim 1, wherein the first space (21), defined by the first housing portion (15) and the second housing portion (6), is sealed to prevent passage of pressure medium from the first space (21) to the second space (22).

5. A hydrostatic-mechanical transmission comprising:
a radial piston motor (1) having cylinders (4) and a crankshaft (2) which supplies driving power to a drive output via at least one spur gear arrangement (7, 8), and the at least one spur gear arrangement (7, 8) and the radial piston motor (1) being arranged in a transmission housing,
wherein the transmission housing comprises at least first, second and third housing portions (5, 6, 15), the first housing portion (15) and the second housing portion (6) together define a first space (21) in which the at least one spur gear arrangement (7, 8) is located,
the second housing portion (6) and the third housing portion (5) define a second space (22) in which the radial piston motor (1) is located, and the second housing portion (6) is located between and adjacent both the spur gear arrangement (7, 8) and the radial piston motor (1), and the cylinders (4) are mounted between the second housing portion (6) and the third housing portion (5), and
the third housing portion (5) is connected with a valve housing (19) which accommodates at least one valve through which pressure medium flows from the radial piston motor (1) into the second space (22).

6. The hydrostatic-mechanical transmission according to claim 5, wherein the radial piston motor (1) is supplied with the pressure medium via the valve housing (19).

7. The hydrostatic-mechanical transmission according to claim 5, wherein a leakage medium, from the radial piston motor (1), flows into the second space (22), and the leakage medium flows from the first space (22) through a cooler (39) and into a pressure medium reservoir (40).

8. The hydrostatic-mechanical transmission according to claim 6, wherein the valve housing (19) houses a flushing valve (35) through which the pressure medium flows from the radial piston motor (1), through a pressure medium return, into the second space (22).

9. The hydrostatic-mechanical transmission according to claim 5, wherein the first space (21) is sealed to prevent passage of pressure medium from the first space (21) to the second space (22).

10. The hydrostatic-mechanical transmission according to claim 5, wherein a crankshaft (2) of the radial piston motor (1) is mounted within the hydrostatic-mechanical transmission by first, second and third bearings (12, 13, 14), the first bearing (12) is supported by the first housing portion (15), the second bearing (13) is supported by the second housing portion (6) and the third bearing (14) is supported by the third housing portion (5).

* * * * *